(12) United States Patent
Hartman

(10) Patent No.: US 6,894,801 B2
(45) Date of Patent: May 17, 2005

(54) RECOVERY OF BIT-ROTATED FRAMES DURING FACSIMILE TRANSMISSIONS IN A GLOBAL SYSTEM FOR MOBILE COMMUNICATIONS (GSM) NETWORK

(75) Inventor: Susan A. Hartman, Thousand Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 10/199,382

(22) Filed: Jul. 19, 2002

(65) Prior Publication Data

US 2003/0002079 A1 Jan. 2, 2003

Related U.S. Application Data (63) Continuation of application No. 09/076,041, filed on May 9, 1998, now Pat. No. 6,486,967.

(51) Int. Cl.[7] .............................. H04N 1/00; H04N 1/32
(52) U.S. Cl. ...................... 358/1.15; 358/409; 358/434; 714/775
(58) Field of Search ................................. 370/358, 360, 370/395.62; 358/1.15, 409, 410, 411, 412, 418, 425, 434, 435, 436, 438, 468; 375/354, 357, 362, 363, 368; 714/746, 752, 775, 776, 789, 798

(56) References Cited

U.S. PATENT DOCUMENTS

| | | | |
|---|---|---|---|
| 5,469,434 A | * 11/1995 | Kurdzo et al. | ............... 370/364 |
| 5,502,653 A | 3/1996 | Lewis | |
| 5,687,199 A | * 11/1997 | Dupuy | ........................ 375/354 |
| 5,799,010 A | * 8/1998 | Lomp et al. | ................. 370/335 |
| 5,892,802 A | 4/1999 | Jung et al. | |
| 5,959,979 A | * 9/1999 | Stratmoen | .................... 370/276 |
| 5,966,373 A | 10/1999 | Stephenson et al. | |
| 6,081,534 A | 6/2000 | Sipila | |
| 6,092,116 A | 7/2000 | Earnest et al. | |
| 6,108,560 A | 8/2000 | Navaro et al. | |
| 6,118,834 A | 9/2000 | Rasanen | |
| 6,122,071 A | 9/2000 | Yoshida | |
| 6,320,880 B1 | * 11/2001 | Suvanen | ..................... 370/512 |
| 6,486,967 B1 | * 11/2002 | Hartman | .................... 358/1.15 |

FOREIGN PATENT DOCUMENTS

WO    WO 9810569 A1 *  3/1998    ........... H04L/29/02

* cited by examiner

*Primary Examiner*—Joseph R. Pokrzywa
(74) *Attorney, Agent, or Firm*—Blakely, Sokoloff, Taylor & Zafman LLP (57) ABSTRACT

A system and method for handling facsimile transmissions in a digital communications network, such as a GSM network. In general, the process includes first synchronizing incoming binary-coded facsimile information and then recording the degree of bit-rotation exhibited by the facsimile information. Segregated portions of the incoming facsimile information are identified as either a synchronization sequence, facsimile status information, or neither type. If a portion of the incoming transmission is identified as facsimile status information, any bit-rotated condition present in the portion is compensated for prior to further processing. In addition, once the incoming information has been synchronized, every time thereafter that a synchronization sequence or facsimile status information is identified in a portion of the incoming information, this event is used as an indication that the facsimile transmission is still in synchronization.

18 Claims, 8 Drawing Sheets

RECOVERY OF BIT-ROTATED FRAMES DURING FACSIMILE TRANSMISSIONS IN A GLOBAL SYSTEM FOR MOBILE COMMUNICATIONS (GSM) NETWORK

CROSS-REFERENCE TO RELATED APPLICATIONS

This is a continuation of application Ser. No. 09/076,041, filed on May 9, 1998 now U.S. Pat. No. 6,486,967.

BACKGROUND

1. Technical Field

This invention relates to a system and process for handling facsimile communications in a global system for mobile communications (GSM) network, and more particularly, to such a system and process that automatically synchronizes incoming facsimile information, detects a bit-rotated condition and recovers bit-rotated status frames in an unspecified GSM network.

2. Background Art

In the new mobile information age, the cellular phone is delivering more than just voice calls. It is being coupled with portable PCs to send and receive information on corporate intranets, the Internet and online services while on the go for increased productivity and efficiency. Mobile systems are evolving at a rapid pace to provide faster and more sophisticated communications capabilities. The Global System for Mobile Communications (GSM) digital cellular technology promises to deliver the robust platform and high-bandwidth needed to realize these sophisticated communications capabilities. For example, GSM technology makes the transmission and receipt of facsimiles over mobile phone systems a reality. The Global System for Mobile Communications technically refers to a standard created in 1987. Thirteen European countries signed a Memorandum of Understanding and agreed to the construction of a standardized telecommunications system. GSM, a digital, multicellular mobile telephone network system, was developed from this standard. In a GSM network, voice is converted into a coded digital signal, which is transmitted and decoded in the receiving GSM handset. Data and facsimiles are also transmitted digitally, currently at 9600 bps, although this data rate is likely to increase significantly in the near future. Originally, GSM was intended to be established only as a Pan-European system, but today has expanded into many other parts of the world, including to some extent the United States of America. Thus, GSM is rapidly becoming a world-wide network. GSM employs a small Subscriber Identity Module Card (SIM Card) that a user inserts into a GSM handset. These SIM cards contain information such as the user's telephone number and billing data, among other things. This enables a user to travel anywhere in the world having a GSM system and receive phone calls and other data transmissions using their usual telephone number by simply inserting their SIM Card into an appropriate GSM handset. Essentially, this is accomplished via an international roaming feature whereby bilateral roaming agreements between service providers allow reciprocal access to each others network. Mobile users do not have to deal with various foreign dialing tones, access codes, country codes or incompatible hardware. Once a user turns on their GSM handset and logs onto the local network, the system finds them and routes all incoming calls and data transmissions to them just as if they were home. In regards to the handling of data transmissions over a GSM network, one of the primary ways in which this is accomplished is with the use of a conventional notebook PC, and a PC Card designed for GSM networks. The PC Card provides the necessary interface between the notebook PC and the GSM handset (and so the GSM network). Since a GSM mobile phone and a portable PC are both digital devices, a modem in the true sense of the word is not necessary. What is needed is Terminal Adapter Equipment (TAE) to translate between the different digital formats of the GSM phone and the PC, and to simulate an ordinary modem to the PC by sending signals such as a dial tone and busy tone. This is a primary function of the GSM PC Card, although not its only one.

The European Telecommunications Standard (ETS) standards document "ETS 300 538" Second Edition, reference RE/SMG-0403045P, "European digital cellular telecommunications system (Phase 2); Technical realization of facsimile group 3 transparent (GSM 03.45)" specifies a standardized "fax adaptation" communications interface used to send and receive group 3 facsimiles (faxes) using the GSM. Among other things, GSM 03.45 defines the following set of fax adaptation frames:

a) SYNC frame—an adaptation frame explicitly designed to allow synchronization at the remote end, even in adverse transmission environments. This frame is a unique frame used even as an idle frame when there is no information to be sent over the radio path. The SYNC frames are 8 octet (i.e. byte) frames containing the following values (in hex notation) as specified by the ETS: "3E 37 50 96 C1 C8 AF 69".

b) STATUS frame—this frame is intended to carry both state identification codes and state specific information that collectively constitute facsimile transmission instructions. The STATUS frame has a unique structured format as shown in the following Table 1:

TABLE 1

| octet 0 | octet 1 | octet 2 | octet 3 | octet 4 | octet 5 | octet 6 | octet 7 |
|---------|---------|---------|---------|---------|---------|---------|---------|
| IDENT | INFO | IDENT | INFO | IDENT | INFO | IDENT | INFO |

The IDENT octets are split into two 4-bit fields, each of which specifies the same state identification code for the status information. The duplication within each IDENT octet is done to mitigate the effects of noise in the bit stream. This is also one of the reasons for repeating of the IDENT and INFO octet pairs four times in each STATUS frame, along with facilitating synchronization checking. The state identification codes contained in the IDENT octets identify what type of state specific information is contained in the INFO octets. For example, an IDENT code 11 (in hex notation) indicates that the INFO octets contain a binary coded signal (BCS) under the ETS. The state specific information contained in the INFO octets can be commands, instructions, etc. For example, in the case of an incoming facsimile transmission, the state specific information may represent a standard facsimile control message used in connection with group 3 faxes. In reference to the state specific information, it is noted that the repetition of the above-described INFO octets in a STATUS frame also allows the incoming bit stream to be adapted to the conventional 300 bps rate associated with the standard facsimile control messages.

c) DATA frame—this frame is fully unstructured and carries fax coded information (i.e. scanline data) when data is being passed.

In simplified terms, a typical facsimile transmission in a GSM network would involve a sending GSM unit initiating the transmission by sending a series of SYNC frames to a receiving GSM unit. The receiving unit would identify one or more of the incoming SYNC frames and use the frame(s) to synchronize the incoming transmission so that the individual SYNC, STATUS and DATA frames can be recognized in the incoming facsimile information and processed accordingly. In addition, the receiving unit transmits a series of SYNC and STATUS frames back to the sending unit. The sending unit uses these frames to synchronize the incoming facsimile information and recognize state specific information contained in the incoming STATUS frames. This information can include items such as the capabilities of the receiving unit. For example, the receiving unit might relay the kinds of data compression it can employ/decode, its data transmission speeds, page sizes it can handle, etc. The sending unit would then transmit, among other things, STATUS frames that specify how the facsimile will be sent in view of the relayed capabilities of the receiving unit. Once the facsimile transmission ground rules are established, the sending unit will transmit the facsimile scan line data by transmitting a special sequence of alternating SYNC and STATUS frames which tell the receiving unit the next non-SYNC/STATUS frame is a DATA frame.

In the true-life realization of a GSM network, the aforementioned frames may be bit rotated from 0 bits to 7 bits. Thus, in order to send and receive facsimiles from any network in the world, there must be a provision for determining the degree of bit rotation in the incoming signal and interpreting the signal so as to synchronize the transmission and recognize the STATUS frame information. One way to accomplish this task would be to store all the bit-rotation patterns for every network in the world. For example, this information could be part of a look up table stored in a memory module of a GSM PC Card. However, such a scheme would have many drawbacks and so is not preferred. For example, this look-up table scheme would require the user to specify what network the handset is operating over via some kind of manual input, so that the system can "look-up" the bit-rotation pattern for that network and apply it to the incoming signal. The requirement for user input to send or receive facsimiles complicates the use of the system and is considered very undesirable. New GSM networks are also being formed at a rapid pace. This would require frequent updating or replacement of the GSM PC Card to add new network bit-rotation patterns to the look-up table. In addition, not all networks cause the same bit-rotation pattern to occur at all times. This would complicate the look-up table scheme in that some method would have to be employed to determine which one of various possible bit-rotation patterns was associated with the incoming signal. Further, if the bit-rotation pattern of the network was completely variable, then the look up table scheme would not work at all.

Accordingly, there is a need for a system and method to process potentially bit-rotated facsimile transmissions in a (GSM) network without knowledge of the bit-rotation patterns associated with the particular GSM network involved or the requirement for a user to input information about the network.

SUMMARY

The above-described needs are realized with embodiments of the present invention directed to a system and method for handling facsimile transmissions in a digital communications network, such as a GSM network. In general, the preferred process includes first synchronizing incoming binary-coded facsimile information and then recording the degree of bit-rotation exhibited by the facsimile information.

Segregated portions of the incoming facsimile information are also identified as either a synchronization sequence, facsimile status information, or neither type. If a portion of the incoming transmission is identified as facsimile status information, any bit-rotated condition present is compensated for prior to further processing. In addition, once the incoming information has been synchronized, every time thereafter that a synchronization sequence or facsimile status information is identified in a portion of the incoming information, this event is used as an indication that the facsimile transmission is still in synchronization. The foregoing process is performed by either a receiving unit receiving a facsimile or by a sending unit receiving facsimile information back from the receiving unit.

The aforementioned synchronizing step is accomplished by first searching the incoming facsimile information for either a non bit-rotated, eight-octet, synchronization sequence, or one of seven other bit-rotated, eight-octet, synchronization sequences. The seven bit-rotated sequences correspond to a version of the non bit-rotated sequence after it has been bit-rotated from one to seven bits, respectively. Specifically, the searching process involves comparing each octet of the incoming facsimile information to the octet occupying a prescribed octet location of each synchronization sequence. For example, assuming the eight octets of each synchronization sequence are sequentially designated by octet locations 0 through 7, the prescribed octet location could correspond to the first octet of each synchronization sequence, i.e. octet location 0. The searching process continues by detecting the first-occurring match between an octet of the incoming facsimile information and one of the compared synchronization sequence octets. The synchronization sequence associated with the matching octet is designated as the selected sequence. The remaining octets of the selected synchronization sequence are then compared to correspondingly located octets of the incoming facsimile information. For example, the remaining seven octets of the selected sequence could be compared to the next seven octets of the incoming facsimile information following the matched octet, in sequence, beginning with the synchronization sequence's octet location 1 and ending with octet location 7. Whenever all eight octets of the selected synchronization sequence match the correspondingly located eight octets of the incoming facsimile data, that eight-octet portion of the incoming facsimile information is designated as the first-discovered synchronization sequence. This first-discovered synchronization sequence is used to build the first eight-octet, logical facsimile adaptation frame (LFAF). Thereafter, every subsequent group of eight octets of the incoming facsimile information is used to build additional LFAFs. The building of these LFAFs amounts to the aforementioned segregating of the incoming facsimile information.

The step of recording the degree of bit-rotation exhibited by the incoming facsimile information involves noting the number of bits the aforementioned selected synchronization sequence is rotated in comparison to the non bit-rotated sequence. This, in turn, indicates the degree of bit rotation associated with the first-discovered synchronization sequence. An indicator of the number of bits the first-discovered synchronization sequence is rotated is then stored for future use. Preferably, the indicator constitutes a number varying from zero to seven, wherein zero indicates that the first-discovered synchronization sequence corresponds to the non bit-rotated sequence, and one through seven indicate that the first-discovered synchronization sequence corresponds to the non-bit-rotated sequence which has been rotated from one to seven bits, respectively.

The aforementioned step of identifying segregated portions of the incoming facsimile information as either a synchronization sequence, facsimile status information, or neither, preferably involves declaring a LFAF to be a SYNC frame if it contains a portion of the incoming facsimile information reported as being a synchronization sequence, declaring a LFAF to be a STATUS frame if it contains a portion of the incoming facsimile information reported as being facsimile status information, and declaring a LFAF to be an Unknown frame if it contains a portion of the incoming facsimile information not reported as being either a synchronization sequence or facsimile status information. Determining whether a LFAF contains a synchronization sequence entails comparing a designated octet of the LFAF to a correspondingly located octet of the previously selected synchronization sequence and then detecting if there is a match. However, in searching for the original synchronization sequence in the incoming facsimile information, it was critical that all eight octets were found to ensure the transmission was properly synchronized. This is not as critical in the LFAF identification process, and fewer than all the octets of the LFAF could be compared and matched to the selected synchronization sequence, thereby simplifying the process to some degree. In addition, the ability to detect the presence of a synchronization sequence in a LFAF by comparing and matching less than all eight octets has a significant advantage in the LFAF identification process. Namely, it is known that the information contained in octet location 0 of a LFAF created from the incoming facsimile information is susceptible to corruption during transmission in some GSM networks. Thus, by eliminating this octet from the comparing step, the ability to identify the LFAF as containing a synchronization sequence is enhanced. While others of the LFAF's octets could also be eliminated from the comparison process to further reduce the processing, this also lowers the confidence level that the LFAF actually the selected synchronization sequence. Therefore, it is preferred that all the remaining octets, exclusive of the first, be used in the comparison. In such a case, the aforementioned correspondingly located octet of the selected synchronization sequence associated with the designated octet of the LFAF preferably corresponds to octet location 1 and the remaining octets of the selected synchronization sequence compared to the correspondingly located octets in the LFAF correspond to octet locations 2 through 7. Finally, the process of determining whether a LFAF contains a synchronization sequence concludes by reporting the LFAF contains such a sequence if all the compared octets match, thereby identifying the LFAF to be a SYNC frame. It is noted that once an LFAF is identified as a SYNC frame, this provides an indication that the facsimile transmission is still in synchronization.

The process of declaring a LFAF to be a STATUS frame involves the steps of comparing at least one of the LFAF's octets residing in either an odd or even octet location with another of the LFAF's octets residing in either an odd or even location, respectively. In other words, an octet occupying an odd octet location is compared an octet occupying another of the odd octet locations, and an octet occupying an even octet location is compared to an octet occupying another of the even octet locations. The number of these octet pairs compared is a question of what level of confidence is required in ascertaining whether a LFAF is a STATUS frame. In the preferred embodiment of the present invention, this process entails comparing the octet at octet location 1 with the octet at octet location 3, the octet at octet location 2 with the octet at octet location 4, the octet at octet location 3 with the octet at octet location 5, and the octet at octet location 4 with the octet at octet location 6. It is believed this pattern of comparison will provide an adequate level of confidence that the LFAF is a STATUS frame if all the compared octets match. However, if desired, the process can additionally entail comparing the octet at octet location 0 with the octet at octet location 2, and the octet at octet location 5 with the octet at octet location 7. It is noted that once an LFAF is identified as a STATUS frame, this fact also provides an indication that the facsimile transmission is still in synchronization.

The general step of compensating for any bit-rotated condition present in a portion of the incoming facsimile information containing facsimile status information is accomplished by rotating the bits of any LFAF declared to be a STATUS frame by the number of bits denoted by the stored indicator. The rotating of bits involves sequentially shifting bits from a front end of the LFAF to a back end of the LFAF until the number of bits shifted equals the number denoted by the stored indicator. This results in placing the STATUS frame in a non bit-rotated condition ready for further processing in the communications system.

The system and method embodying the present invention also include a capability to determine whether the incoming facsimile information is still in synchronization whenever an LFAF is declared to be an Unknown frame and no facsimile scan line data is expected. Preferably, this is accomplished by monitoring what type of frame each LFAF is declared to be and then tracking the number of consecutive LFAFs declared to be Unknown frames. Whenever a prescribed number of consecutive Unknown frames are detected, the incoming facsimile information is declared to be out of synchronization. This prescribed number is preferably five frames. Finally, the incoming facsimile information is re-synchronized by starting the foregoing process over from the beginning. This is done whenever it is determined that the transmission has fallen out of synchronization.

The foregoing process as employed in an appropriate computing environment, be it a firmware adaptation or a general purpose computer, resolves the problems described in connection with handling facsimile transmissions in a GSM network. The process allows bit-rotated STATUS frames to be placed in a non bit-rotated condition prior to being processed in the system. This is done automatically by gleaning the degree of bit rotation from the first synchronization sequence discovered in the incoming facsimile information, and then using this knowledge to compensate for the undesired bit-rotation caused by the particular GSM network the user is employing to receive or send the facsimile. No prior knowledge about the GSM network is necessary and the user does not need to input anything to facilitate the bit rotation compensation process. In addition, as an added benefit of the bit rotation compensation process, synchronization sequences and facsimile status information embedded within the incoming facsimile information are identified and used to confirm that the facsimile transmission is still in synchronization.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

The present invention in general relates to a system and process for handling facsimile communications in a global system for mobile communications (GSM) network. This system and process is employed by both a receiving unit receiving a facsimile and by a sending unit receiving facsimile information (such as the receiving unit's facsimile capabilities) back from the receiving unit. The system may be specifically constructed for the required purpose of performing the process of the present invention, such as a firmware implementation of the process. Alternatively, the system may involve the use of a general purpose computer selectively configured by a computer program stored in the computer.

Figure 1:
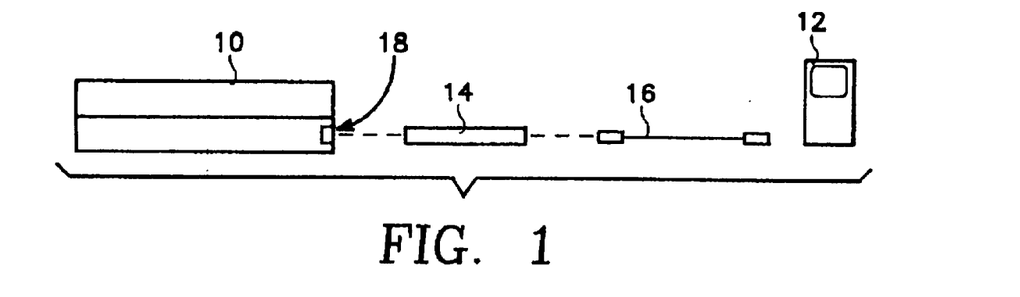
FIG. 1 is a diagram depicting an exemplary operating environment for implementing a process embodying the present invention involving the use of a portable PC, GSM handset and a PC Card.
Figure 2:
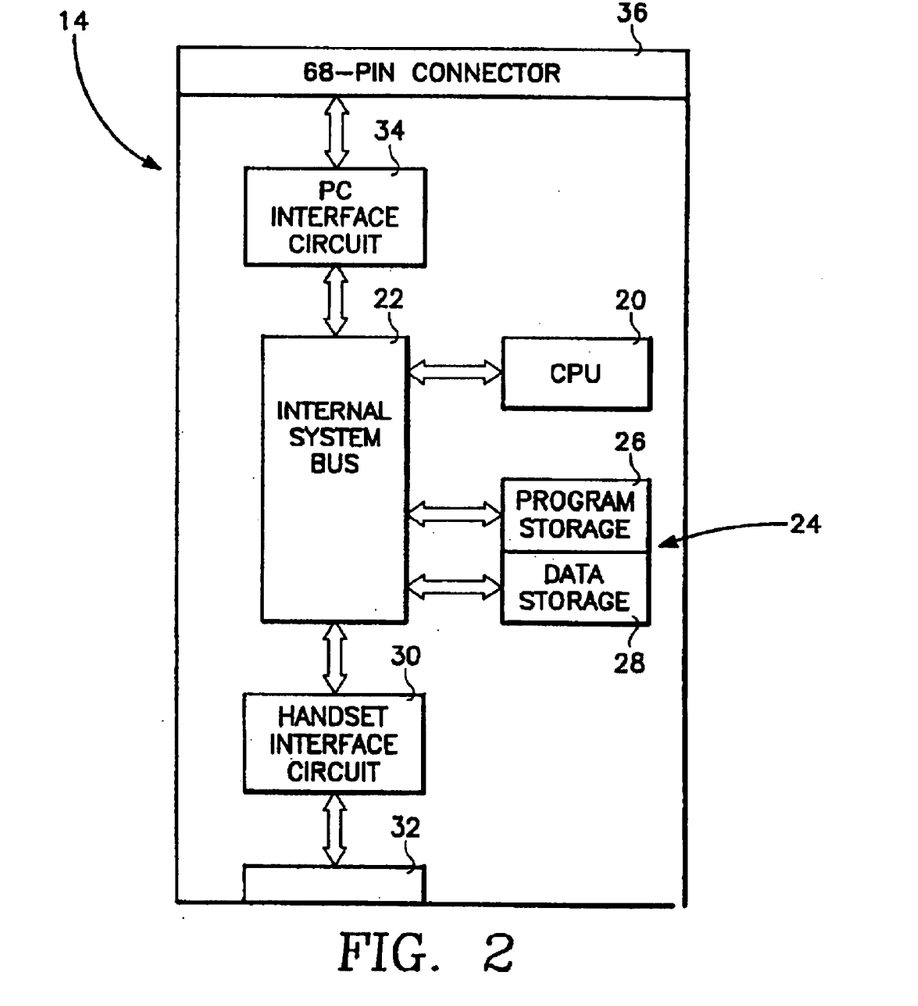
FIG. 2 is a block diagram of the major components of the PC Card of FIG. 1 used to implement the process embodying the present invention.

In regards to a firmware embodiment of the present invention, FIG. 1 illustrates one possible operating environment for the system. A portable personal computer (PC) 10, often also referred to as a notebook computer, is interfaced with a GSM handset 12 using a GSM PC Card 14 (e.g. a "PC Card 16", or a "PC Card 32" often referred to as a CardBus) and the appropriate interface cabling 16. In the depicted operating environment, the GSM PC Card 14 is inserted into the PC Card slot 18 of the portable PC 10. The GSM PC Card 14 is also connected to the appropriate I/O port of the GSM handset 12. It is the GSM PC Card 14 that contains the firmware implementation of the present invention. Referring to FIG. 2, a simplified block diagram of the GSM PC Card 14 is presented. This diagram shows only the major components of the Card 14 that are involved with the present invention for the sake of simplicity. The Card 14 includes a central processing unit (CPU) 20 which is coupled to an internal system bus 22. The system bus 22 may be any of several types of bus structures including a memory bus or memory controller, a peripheral bus, and a local bus using any of a variety of bus architectures. A memory 24 is also coupled to the internal system bus 22. A program storage portion 26 of the memory is used, among other things, to store the programming code associated with the process of the present invention. The data storage portion 28 of the memory is used to store incoming data, as well as processed versions of this data. There is also a handset interface circuit 30 connected between the system bus 22 and a connector 32 used to link a GSM handset via an interface cable to the PC Card 14. A separate PC interface circuit 34 is connected between the system bus 22 and a standard 68-pin PC Card connector 36 to link a portable PC to the PC Card 14. In operation, data received by the GSM handset depicted in FIG. 1 is transferred to the data storage portion 28 of the memory via the handset interface circuit 30 and the system bus 22. The CPU 20 operates on this data using instructions provided by the program code resident in the program storage portion 26 of the memory. Processed versions of the data are then stored in the data storage portion 28 of the memory after being operated on by the CPU 20. The CPU 20 also controls the flow of data from the data storage 28 to the portable PC via the system bus 22 and the PC interface circuit 34. Data can also be transferred under the control of the CPU from the portable PC, via the system bus 22 and the two interface circuits 30, 34, to the GSM handset for further transmission. It is noted that the operating environment depicted in FIG. 1 does not represent the only operating environment for a firmware implementation of the present invention. Rather many configurations are possible. For example, the portable PC might be replaced by a PC Card capable hand-held computing device, such as a so called personal digital assistant. Another example of an alternate operating environment would involve replacing the portable PC with a desktop PC and the PC Card with an internal circuit card that includes the above-described components. Thus, the operating environment associated with a firmware implementation of the present invention is not limited to that depicted in FIG. 1.

Figure 3:
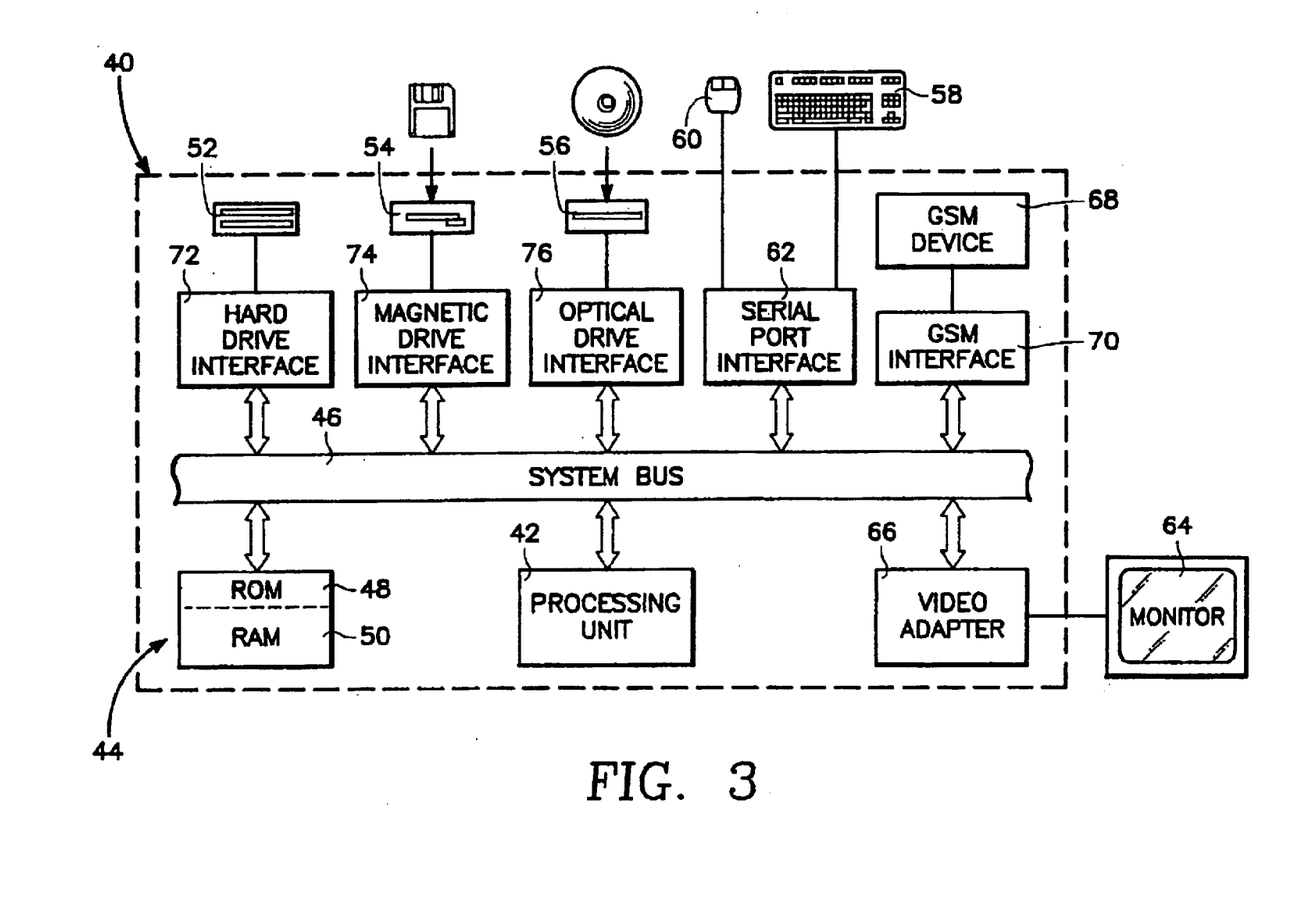
FIG. 3 is a diagram depicting a general purpose computing device constituting another exemplary system for implementing the present invention.

In regards to the aforementioned implementation of the invention in a software program running on a general purpose computer system, FIG. 3 depicts a suitable computing environment for this implementation. The exemplary computer system of FIG. 3 includes a general purpose computing device in the form of a conventional personal computer 40, including a processing unit 42, a system memory 44, and a system bus 46 that couples various system components including the system memory to the processing unit 42. The system bus 46 may be any of several types of bus structures such as described previously in connection with the firmware embodiment of the invention. The system memory includes read only memory (ROM) 48 and random access memory (RAM) 50. The personal computer 40 further includes data storage devices such as, but not limited to, a hard disk drive 52, a magnetic disk drive 54, and an optical disk drive 56. All of these drives are respectively connected to the system bus 46 via an appropriate interface 72, 74, 76 and are capable of reading from and writing to an appropriate computer-readable medium (e.g. hard disk, magnetic disk, or optical disk, respectively). The drives and their associated computer-readable media provide nonvolatile storage of computer readable instructions, data structures, program modules and other data for the personal computer 40, as do the ROM 48 and RAM 50. These may include an operating system, one or more application programs, other program modules, and data.

A user may enter commands and information into the personal computer 40 through input devices such as, but not limited to a keyboard 58 and pointing device 60 (e.g., a computer mouse). These and other input devices are typically connected to the processing unit 42 through a serial port interface 62 via the system bus 46. A monitor 64 is also connected to the system bus 46 typically via a video adapter 66. Personal computers usually also include other peripheral output devices (not shown), such as speakers and printers, connected via appropriate interfaces. It is noted that while the above description refers to a PC, those skilled in the art will appreciate that the invention may be practiced with other software configurable computing systems, including hand-held devices, multiprocessor systems, microprocessor-based or programmable consumer electronics, network PCs, minicomputers, mainframe computers, and the like.

In the context of the present invention, the personal computer 40 would also include a connection to a GSM device 68 via an appropriate interface 70, which is linked to the system bus 46, for establishing communications over a GSM network. This GSM device 68 may be internal, as depicted in FIG. 3, or external such as the GSM handset connected to the computer through a GSM-compatible connector and an interface cable (similar to the set-up of FIG. 1).

No particular programming language has been indicated for carrying out the various processes described herein. Each designer will be aware of a language which is most suitable for his or her immediate purposes. In addition, because the computers, and other devices which may be used in practicing the instant invention consist of many diverse elements, no detailed program listing has been provided. It is considered that the operations and other procedures described herein and illustrated in the accompanying drawings are sufficiently disclosed to enable one of ordinary skill in the art to practice the instant invention. Further, the invention will be described in the general context of process steps, such as can be embodied in program modules and sub-modules executable by an appropriate computing device. Generally, these program modules and sub-modules include routines, programs, objects, components, data structures, etc. that perform particular tasks or implement particular abstract data types.

Figure 4:
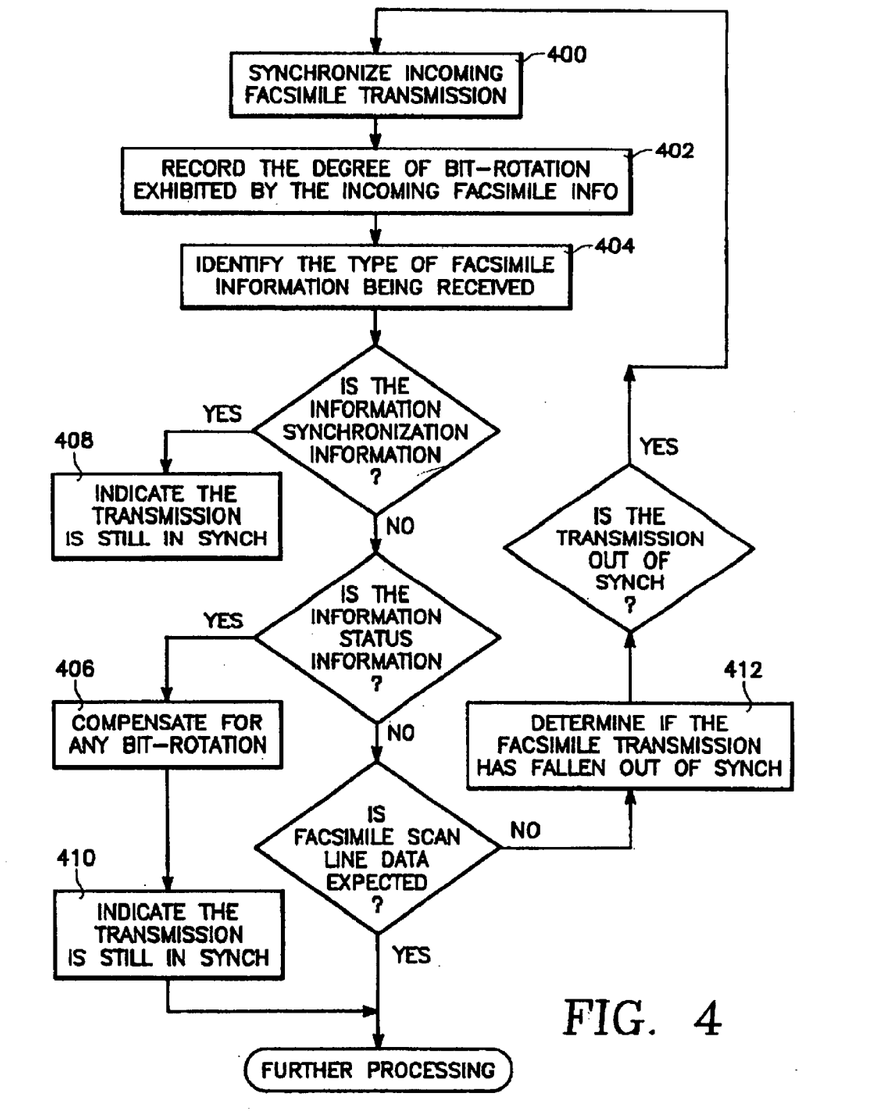
FIG. 4 is a block diagram of an overall process for handling the receipt of facsimile transmissions in a digital communications network according to the present invention.

The exemplary operating environments having now been discussed, the remaining part of this section will be devoted to a description of the preferred program modules embodying the invention. FIG. 4 provides a general overview of a preferred process in accordance with the present invention for handling group 3 facsimile transmissions in a GSM network. The first program module 400 in the process involves synchronizing an incoming facsimile transmission. This synchronization includes generating logical facsimile adaptation frames (LFAFs). The second module 402 involves identifying and recording the degree of bit-rotation exhibited by the incoming facsimile information, which can vary from none at all, up to a rotation of seven bits. The third module 404 involves identifying the frame type of each LFAF generated (e.g. SYNC frame, STATUS frame, or neither). The fourth program module 406 concerns compensating for the bit rotation in each STATUS frame identified, so as to make the frame interpretable under the European Telecommunication Standard (ETS) guidelines.

It is noted that whenever a SYNC frame or STATUS frame is identified in the third program module 404, this in itself provides an indication that the transmission is still in synchronization (program modules 408 and 410). Further, if neither a STATUS or SYNC frame is identified, the frame will be designated as an "Unknown" frame. An Unknown frame will be processed as a DATA frame if facsimile scan line data is expected (as will be discussed in further detail later in this description). If, however, no DATA frames are expected, the identification of an Unknown frame could indicate a SYNC or STATUS frame was received but corrupted by noise to the extent it is unrecognizable. This reasoning holds s because facsimile transmissions between sending and receiving GSM units either constitute consecutive DATA frames, a series of SYNC and STATUS frames, or a series of consecutive SYNC frames. If no DATA frames are expected, the transmission will exclusively be made up of SYNC and STATUS frames. Further, the identification of Unknown frames when no DATA frames are expected could be an indication that the transmission has fallen out of synchronization. Thus, a determination is made as to whether the transmission is out of synchronization (program module 412). If the transmission is found to be out of synchronization, the foregoing process is restarted beginning with the first program module 400 so as to re-synchronize the transmission.

1.0 Synchronizing the Transmission and Building LFAFs

Figure 5:
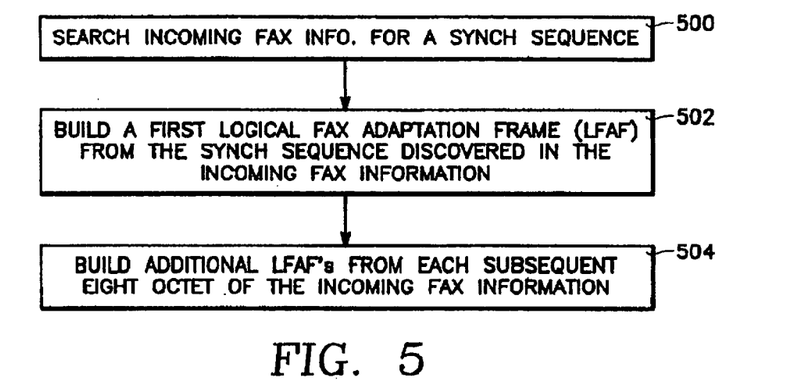
FIG. 5 is a block diagram of a process for synchronizing an incoming facsimile transmission as required by the overall process of FIG. 4.

Facsimile information is transmitted over a GSM network in batches of octets or bytes (i.e. 8-bit segments of data). Typically, when the network is operating at the most commonly used data transfer rate of 9600 bps, each data batch will consist of 24 octets. Information received by a GSM unit is placed in an appropriate system memory—for example, the data storage described in connection with the firmware embodiment of FIG. 2 or the RAM discussed in connection with the software embodiment of FIG. 3. In the case of a 9600 bps GSM network connection, a 24-octet memory location is employed to hold the incoming facsimile information. Referring to FIG. 5, the first step or sub-module 500 in the synchronization process is to search the data held in the 24-octet memory location for a synchronization sequence. Such a sequence is expected because the GSM network initially sends a series of back-to-back SYNC frames when attempting to transmit facsimile information. Since a SYNC frame comprises eight octets, the data stored in the 24-octet memory location should, barring noise problems, contain at least one and up to three of the transmitted SYNC frames. As discussed previously, the synchronization sequence in a GSM facsimile transmission not exhibiting any bit-rotation, will consist of the following 8 octets (in hex notation): "3E 37 50 96 C1 C8 AF 69", per the ETS guidelines. However, this sequence can be received in a bit-rotated condition comprising a shift of anywhere from one to seven bits. Thus, the specified synchronization sequence may not be seen in the incoming transmission. Rather, the actual synchronization sequence received can be any of eight possibilities (i.e., not bit-rotated or bit-rotated between one and seven bits), only one of which matches the sequence specified in the ETS guidelines. The eight possible sequences are provided below in Table 2 (in hex notation).

TABLE 2

|  | octet 0 | octet 1 | octet 2 | octet 3 | octet 4 | octet 5 | octet 6 | octet 7 |
|---|---|---|---|---|---|---|---|---|
| 0 bit rotation | 3E | 37 | 50 | 96 | C1 | C8 | AF | 69 |
| 1 bit rotation | 9F | 1B | A8 | 4B | 60 | E4 | 57 | B4 |
| 2 bit rotation | 4F | 8D | D4 | 25 | B0 | 72 | 2B | DA |
| 3 bit rotation | 27 | C6 | EA | 12 | D8 | 39 | 15 | ED |
| 4 bit rotation | 93 | E3 | 75 | 09 | 6C | 1C | 8A | F6 |
| 5 bit rotation | 49 | F1 | BA | 84 | B6 | 0E | 45 | 7B |
| 6 bit rotation | A4 | F8 | DD | 42 | 5B | 07 | 22 | BD |
| 7 bit rotation | D2 | 7C | 6E | A1 | 2D | 83 | 91 | 5E |

Figure 6:
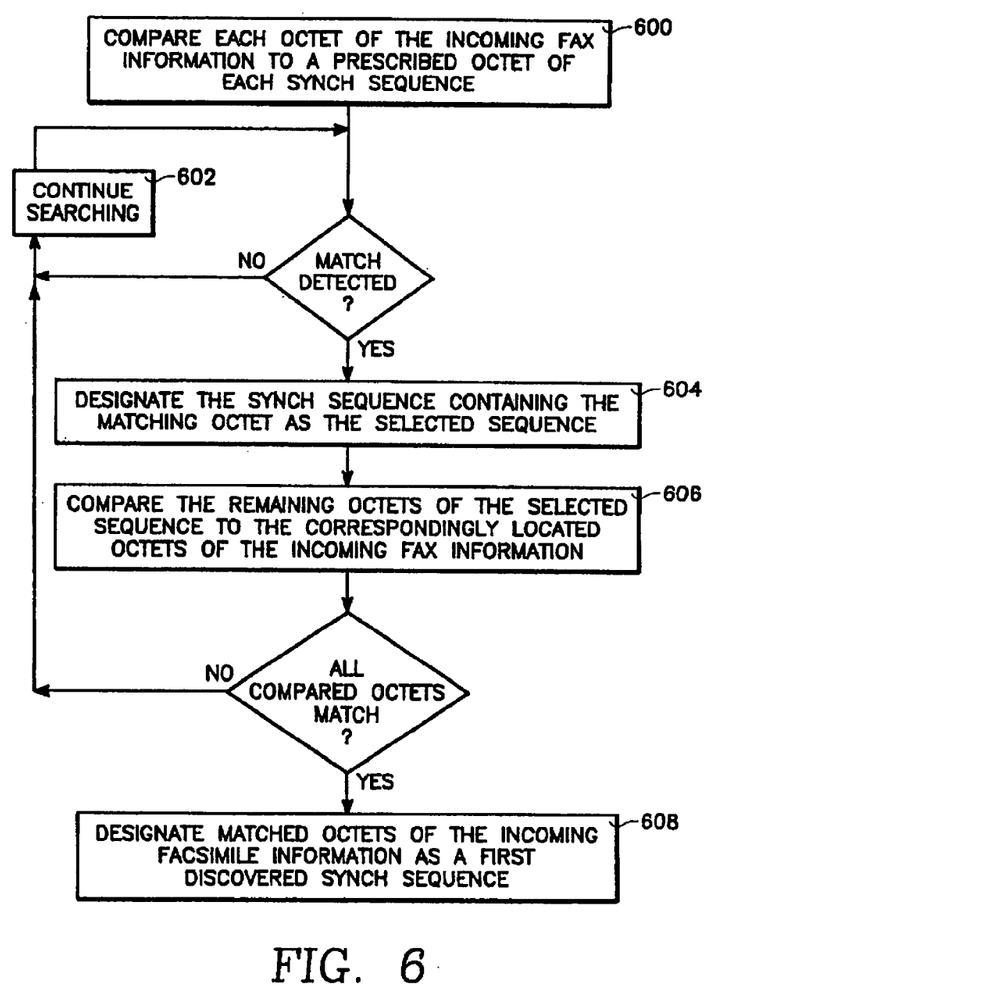
FIG. 6 is a block diagram of a process for searching the incoming facsimile information for a synchronization sequence as required by the process of FIG. 5.

Referring to FIG. 6, the synchronization sequence search procedure preferably entails comparing each octet of the data held in the 24-octet memory location to any one of the eight first octets (i.e. octet 0) of the synchronization sequences listed in Table 2 (step 600). The comparison process continues until a match is found (step 602). Once one of these first octets is found in an octet of the 24-octet memory location data, the synchronization sequence associated with the matching octet is designated the selected sequence (step 604). The remaining octets of the selected synchronization sequence are then compared one at a time to the corresponding octets in the memory location (step 606). For example, the second octet (i.e., octet 1) of the selected synchronization sequence is compared to the octet immediately following the matching octet in the 24-octet memory location, and so on. If all eight octets of the selected synchronization sequence match the corresponding octets in the 24-octet memory location, then it is determined that the group of matching octets represent a first-discovered synchronization sequence (step 608). However, if any one of the eight octets of the selected sequence does not match the corresponding octets in the memory location, the search process is continued. If a complete synchronization sequence is not found in the 24-octet memory location, then the data therein is discarded and replaced with the next incoming data batch. The search process is then repeated for the new data batch, and the next, until a complete match to one of the synchronization sequences is found.

Referring again to FIG. 5, once a SYNC frame has been found in the 24-octet memory location it is transferred in its entirety to a logical facsimile adaptation frame (LFAF) as defined in the ETS (step 502). A LFAF is an eight octet frame constructed from information transferred from the 24-octet memory location, and can represent either the aforementioned SYNC, STATUS or DATA frames. Each LFAF preferably resides in its own separate memory location within the system memory until after it is processed. Any facsimile information remaining in the 24-octet memory location that was received after the discovered synchronization sequence is transferred to a new LFAF until it is filled. If there is not enough octets to fill another LFAF, then it is completed using the first received facsimile information from the next batch received into the 24-octet memory location. This process is called building the LFAF. Once a LFAF is filled, it is immediately processed, as will be described later in this description. This processing is always faster than the rate at which information is received into the 24-octet memory location, therefore, nothing is lost. The process of transferring information from the 24-octet memory location to successive LFAFs continues throughout the facsimile transmission (step 504).

The foregoing process constitutes a synchronization of the transmission because once a complete SYNC frame is found in the 24-octet memory location and transferred to the first LFAF, each succeeding 8-octet LFAF generated will also constitute a complete GSM frame, i.e., either a SYNC frame, STATUS frame, or DATA frame. However, it should be noted that the LFAF may also be categorized as an "Unknown" frame under certain conditions to be discussed later in this description.

Even though the transmission is initially synchronized, noise or other factors could result in it falling out of synchronization. Consequently, it is preferred that the synchronization be continuously checked. Referring to FIG. 4 once again, one method of accomplishing this task in accordance with the present invention is to identify a LFAF as either a SYNC or STATUS frame. If a LFAF generated from the incoming facsimile information is determined to be a SYNC or STATUS frame, this is conclusive evidence that the transmission is still in synchronization otherwise such frames would not be found. Thus, whenever a SYNC frame is identified, an indication that the transmission is in synchronization is generated (step 408). Likewise, when a STATUS frame is identified, an indication of synchronization is generated (step 410). As the facsimile transmission process involves the exchange of numerous SYNC and STATUS frames, identifying these frames in a generated LFAF is an effective method of ensuring the transmission is still synchronized. Of course, additional synchronization methods can also be employed as desired. The methods by which LFAFs are identified as SYNC frames or STATUS frames will be discussed in detail later in this description.

2.0 Identifying & Recording Bit-Rotations

Figure 7:
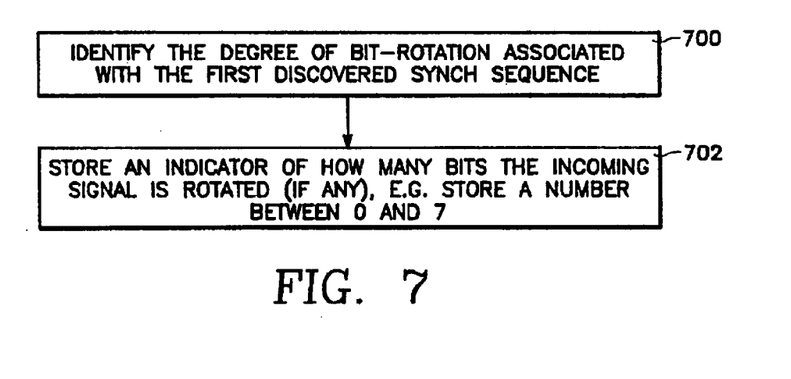
FIG. 7 is a block diagram of a process for recording the degree of bit-rotation associated with the incoming facsimile transmission as required by the overall process of FIG. 4.

Once the transmission has been synchronized and the LFAFs are being generated from the incoming facsimile information signal, the next phase of the process is to identify and record the degree of bit-rotation exhibited by the incoming facsimile information. Referring to FIG. 7, the first step or sub-module 700 in the process is to identify the degree of bit-rotation associated with the aforementioned selected synchronization sequence (and so the first-discovered synchronization sequence) in accordance with Table 2. This information is then stored in a unique memory location as an indicator of how many bits the incoming signal is rotated, if any (step 702). For example, a non-bit rotated condition could be recorded by storing the number 0, whereas a rotation of one bit would be recorded by storing the number 1, and so on. It is noted that the same process can be repeated for every subsequent LFAF identified as a SYNC frame as a check to ensure the degree of bit rotation has not changed—although such a event is unlikely. The stored bit rotation information will be used later to assist in the interpretation of a STATUS frame.

3.0 Identifying LFAF Types

It is not known what type of LFAF is being generated from the incoming facsimile information after the first LFAF is formed. Therefore, before the required processing of a LFAF can occur, the frame type must be identified. In addition, for the purpose of simplifying the present process, it is preferred the frame type of the first LFAF also be confirmed by re-determining that it is a SYNC frame. In this way, each frame goes through the identification process and special provisions need not be made for the first LFAF.

Figure 8:
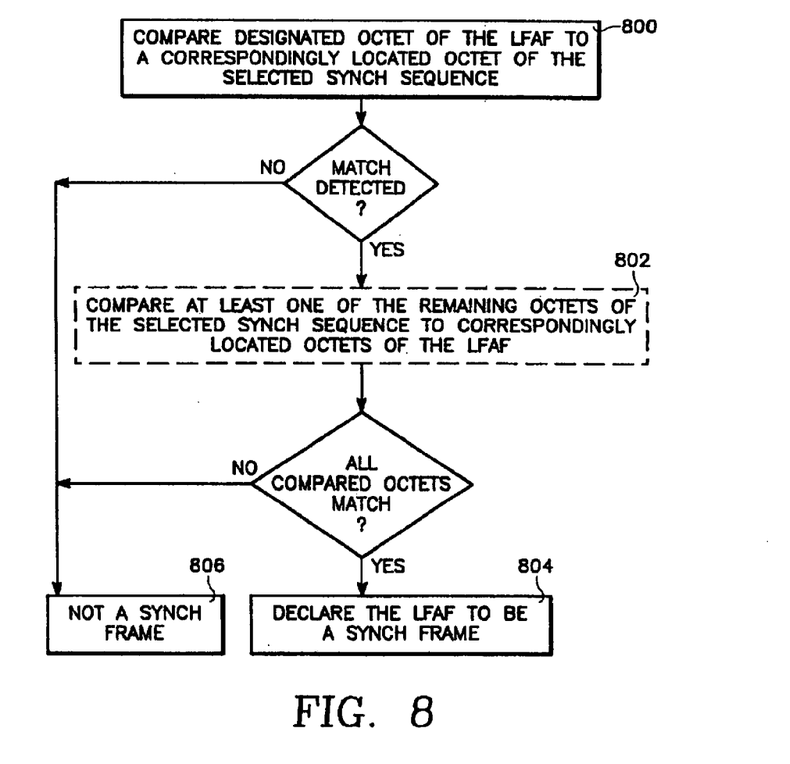
FIG. 8 is a block diagram of a process for identifying or confirming that a logical facsimile adaptation frame (LFAF) is a SYNC frame as required by the process of FIG. 4.

Referring to FIG. 8, a SYNC frame is identified (and the first LFAF is confirmed to be a SYNC frame) by a method similar to that used to synchronize the transmission. Specifically, one of the octets of the LFAF is chosen and compared to the corresponding octet in the synchronization sequence designated as the selected sequence in the previously-described process of synchronizing the incoming facsimile information (step 800). However, unlike the method used to synchronize the transmission, the first octet (octet 0) need not be used for this initial portion of the identification process. In fact, it is preferred that the first octet not be used. It is known that the first octet in a LFAF is the most susceptible to corruption due to noise or other factors effecting the transmission of a facsimile over some GSM networks. In the initial synchronization process it was critical that all the octets of a synchronization sequence be found in the 24-octet memory location to provide the maximum degree of confidence that the eight octets selected from the memory location actually represented a SYNC frame. This ensures the transmission is synchronized. However, when determining or confirming the identity of an already constructed LFAF the requirement is not as critical. Thus, due to the aforementioned possible corruption of the first octet in a SYNC frame (exclusive of the first LFAF), it is acceptable to ignore this octet in the synchronization sequence comparison steps. Thus, it is preferred that one of the other octets be selected for the comparison process. The second octet (i.e., octet 1) was chosen for the comparison in the tested embodiment of the present invention, and is preferred for computational efficiency reasons. However, any of the remaining octets could be employed, as well. If no match is found then the LFAF is not a SYNC frame and other processing is performed. In the case where the comparison process was performed to confirm the existence of a synchronization sequence in the first LFAF and no match is detected, albeit unlikely, it is assumed an error has occurred and the aforementioned further processing entails re-starting the synchronization process described in connection with FIG. 4. If, however, a match is found between the chosen octet in the LFAF being identified and the corresponding octet in the selected synchronization sequence, it is preferred that other octets from the LFAF are then compared to the values of the corresponding octets in the selected synchronization sequence (step 802), with the exception of the first octet (octet 0) if this octet is to be ignored. The purpose of checking the remaining octets is to increase the confidence level that the unidentified LFAF is actually a SYNC frame. Of course, the more octets that match, the higher the confidence. In the tested embodiment, the remaining synchronization sequence octets 2 through 7 (of Table 2) are compared to the corresponding octets of the unidentified LFAF to maximize the confidence level that the frame is a SYNC frame. However, less than the six remaining octets (i.e. octets 2–7) could be compared and matched. For example, in some GSM networks it is believed that not only the first, but the last, octet in a frame may be corrupted during transmission. If the corruption of the last octet (octet 7) is a concern, it could be ignored as well. Thus, after the first octet (e.g. preferred octet 1) is matched per the above procedure, just the remaining five octets (i.e., octets 2–6) would be compared and matched. If all the "compared" octets match the corresponding octets in the selected synchronization sequence, then the unidentified LFAF is "declared" to be a SYNC frame (step 804). If all the compared octets do not match, then the LFAF is determined not to be a SYNC frame (step 806).

It is noted that while octets of the LFAF are exclusively compared to corresponding octets of the selected synchronization sequence in the foregoing SYNC frame identification process, this need not be the case. While the described method is preferred to minimize processing, if desired, the chosen octets of the LFAF could be compared to correspondingly located octets of each of the possible synchronization sequence listed in Table 2, similar to the process employed to initially identify a synchronization sequence in the incoming facsimile information (i.e. the process associated with FIG. 6).

Figure 9:
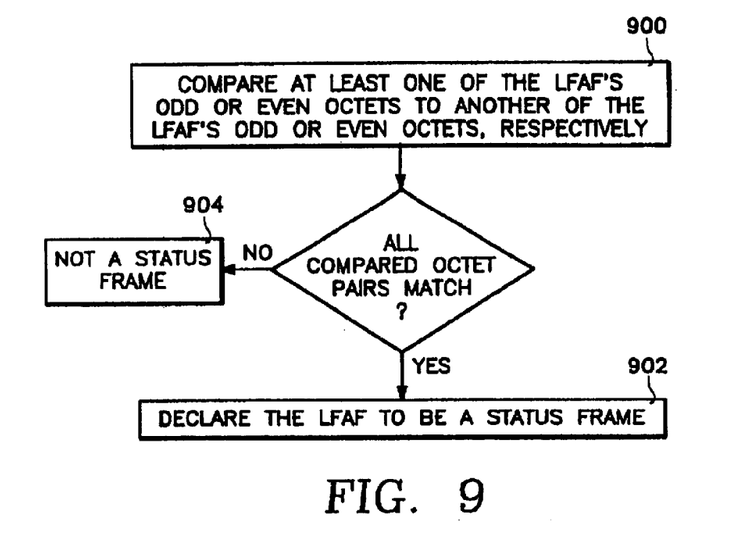
FIG. 9 is a block diagram of a process for identifying that a LFAF is a STATUS frame as required by the process of FIG. 4.

A STATUS frame is identified by taking advantage of its repetitive structure. The process for determining if an unidentified LFAF is a STATUS frame involves comparing certain octets and noting whether they are equal. Generally, as depicted in FIG. 9, pairs of odd octet locations are compared to each other and pairs of even octet locations are similarly compared (step 900). The number of octet pairs compared depends on what level of confidence is desired for determining that an LFAF is a STATUS frame. This number can vary from one pair to every possible pair. However, it is preferred that logic requiring the comparison of four octet pairs (i.e. two even and two odd) be employed in the identification process. Using the octet identifiers of Table 2, the preferred logic is as follows:

If octet 1=octet 3 AND
    octet 3=octet 5 AND
    octet 2=octet 4 AND
    octet 4=octet 6 THEN
the LFAF is a STATUS frame.

As indicated in the above logic, if all the compared octet pairs match each other, then the LFAF is declared to be a STATUS frame (step 902). If, however, all the pairs do not match, then the LFAF is determined not to be a status frame (step 904). The above logic produces a high level of confidence that the unidentified LFAF is a STATUS frame, however, fewer comparisons could be made if desired, albeit producing a lower confidence level. It is also noted that none of the comparisons involved the first octet (octet 0) or the last octet (octet 7). As explained previously, these octets can be susceptible to corruption during the transmission of the facsimile over some GSM networks, and so are not relied upon to determine the identity of a STATUS frame. However, if it is desired, additional comparisons can be made involving the first and last octets before declaring an unidentified LFAF to be a STATUS frame:

octet 0=octet 2 AND
octet 5=octet 7.

It is noted that while the foregoing logic requires both the first and last octets to match other octets in the frame, the logic could alternatively only require that either match (i.e., OR).

Finally, an unidentified LFAF that is neither determined to be a SYNC frame or a STATUS frame is given a designation of an "Unknown" frame, as discussed previously. This frame may be ignored, used to determine a loss of synchronization or processed as a DATA frame depending on circumstances. In the last case, a transmitted frame sequence involving the repetition of a SYNC frame alternated with a particular type of STATUS frame (i.e., SYNC-STATUS-SYNC-STATUS . . . ) is used to indicate that the transmitting GSM unit wants to send facsimile DATA frames. Once this signal is detected by the receiving unit, and the receiving unit response with its own SYNC-STATUS-SYNC-STATUS . . . frame sequence, the next incoming "Unknown" frame would be interpreted as a DATA frame. A series of SYNC frames is typically sent to signal the end of the scan line data transmission.

4.0 Compensating for a Bit-Rotated Condition in a STATUS Frame

Figure 10:
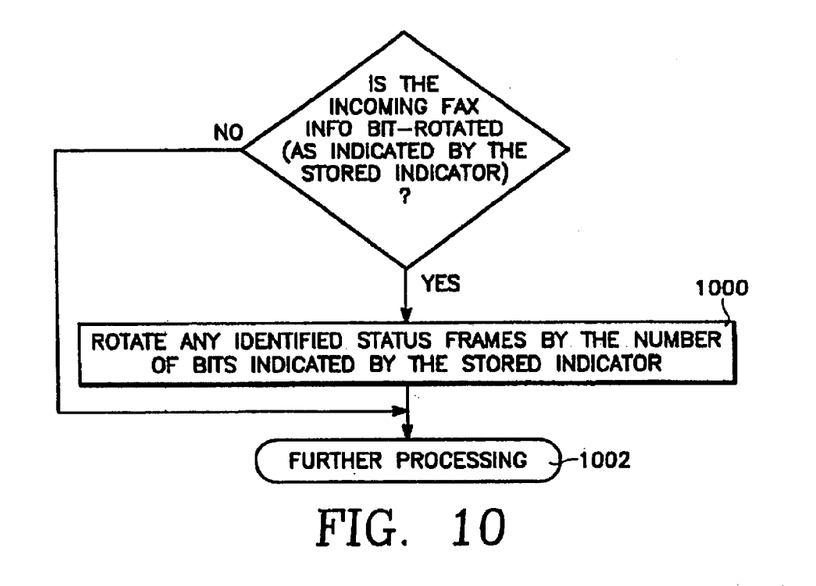
FIG. 10 is a block diagram of a process for compensating for bit rotation in a STATUS frame as required by the process of FIG. 4.

If it is determined that a LFAF is a STATUS frame, the next phase in the process according to the present invention is to rotate the frame bits based on the stored bit-rotation indicator so that the IDENT and INFO octets can be interpreted via the ETS guidelines. It is noted that since the first LFAF generated is a SYNC frame, the bit-rotation information is determined and stored before the first STATUS frame is processed, thereby ensuring it is available for this part of the procedure. In general, an identified STATUS frame undergoes the bit rotation compensation step or sub-module if the stored bit-rotation indicator indicates the incoming facsimile information is bit-rotated. If not, this step is skipped. When the incoming facsimile information is bit-rotated, the identified STATUS frame will also be bit-rotated to the same degree. This condition is compensated for by rotating the STATUS frame bits by the number of bits indicated by the stored bit-rotation indicator (step 1000). It is believed this STATUS frame bit rotation process can be best explained in reference to the following example.

A typical STATUS frame with no bit rotation might read (in hex notation):

11 7E 11 7E 11 7E 11 7E.

This same STATUS frame exhibiting a three bit rotation would be read (in hex notation):

C2 2F C2 2F C2 2F C2 2F.

Thus, the previous portion of the instant process would have determined the SYNC frame to be associated with the three bit-rotated synchronization sequence, thereby indicating the subsequent STATUS frame would also exhibit a rotation of three bits. To compensate for this bit rotation, the bit-rotated STATUS frame would be rotated by 3 bits to make it interpretable under the ETS guidelines. The first two octets of the bit-rotated STATUS frame will be used to illustrate this compensation process:

| | |
|---|---|
| C2 2F in binary notation is: | 1100 0010 0010 1111 |
| The bit string is shifted three bits to the left: | 0 0010 0010 1111 xxx |
| The three leftmost bits of the original bit string are place onto the right end of the shifted bit string: | 0 0010 0010 1111 110 |
| This bit string is usually depicted as: | 0001 0001 0111 1110 |
| Written in hexadecimal form: | 11 7E |

As can be seen the "11 7E" is the first two octets of the STATUS frame having no bit rotation. The same process can be used for the full eight octet frame with the same results. In addition, any other bit-rotation condition from 1 to 7 can be compensated for by simply shifting and placing the corresponding number of bits in the manner described in the above example. Thus, the process can be used to convert any bit-rotated STATUS frame to one interpretable under the ETS guidelines (step 1002).

Figure 11:
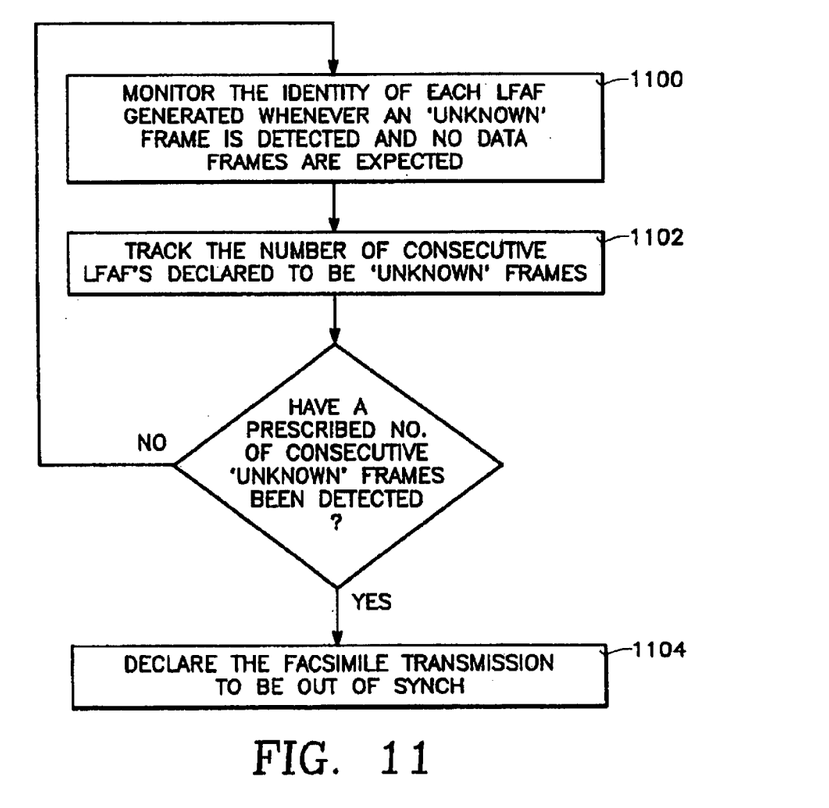
FIG. 11 is a block diagram of a process for determining if the facsimile transmission has fallen out of synchronization as required by the process of FIG. 4.

5.0 Determining Whether the Facsimile Transmission Has Fallen Out of Synchronization If it is determined that a LFAF is not a SYNC frame or STATUS frame (i.e. an Unknown frame), and no DATA frames are expected in the incoming facsimile information, then a determination is made as to whether the transmission has fallen out of synchronization. Referring to FIG. 11, this determination is made by monitoring the type of each LFAF identified via the previously-described LFAF identification process whenever an Unknown frame is detected at a time when no DATA frames are expected to be received (step 1100). If the facsimile transmission falls out of synchronization at a time when no DATA frames are being transmitted, it would be expected that a series of consecutive Unknown frames would be identified. This is opposed to a situation where the incoming facsimile information remains synchronized but a particular SYNC or STATUS frame is unrecognizable due to itinerant noise. Thus, it is possible to detect a loss of synchronization by tracking the number of consecutive LFAFs identified as being Unknown frames (step 1102) and declaring the transmission to be out of synchronization if a prescribed number of consecutive Unknown frames are detected (step 1104). It is preferred that this prescribed number be five consecutive Unknown frames, however, any number could be used. As indicated previously in connection with the description associated with FIG. 4, the incoming facsimile information is re-synchronized whenever the transmission is declared to have fallen out of synchronization.

While the invention has been described in detail by reference to the preferred embodiment described above, it is understood that variations and modifications thereof may be made without departing from the true spirit and scope of the invention. For example, in the foregoing description, the first-discovered synchronization sequence found in the incoming facsimile information was transferred to a separate memory location for further processing. In addition, each subsequent eight octets of the facsimile information were also transferred from the 24-octet memory location to a different eight-octet memory location to build LFAFs. However, rather than transferring the information, each eight-octet LFAF could instead be identified within the 24-octet input memory location itself using pointers and processed directly from this location.

What is claimed is:

1. A method comprising:

frame-synchronizing incoming facsimile information to delineate logical facsimile adaptation frames ("LFAFs"), the frame-synchronization including locating a synchronization ("SYNCH") frame containing a bit-rotated version of a unique synchronization sequence, the bit-rotated version comprising the unique synchronization sequence bit-rotated by a degree between zero bits and a predetermined number of bits;

determining a degree of bit-rotation of the SYNCH frame by observing the degree of bit-rotation of the bit-rotated version of the unique synchronization sequence in the SYNCH frame compared to the unique synchronization sequence with zero bit-rotation;

identifying a status ("STATUS") frame;

inferring that the status frame is bit-rotated to the same degree as the SYNCH frame; and compensating for the inferred degree of bit-rotation of the STATUS frame using the observed degree of bit-rotation.

2. The method of claim 1, wherein each LFAF comprises eight octets in octet locations labeled 0 to 7.

3. The method of claim 2, wherein locating the SYNCH frame comprises:

comparing each octet of the incoming facsimile information to an octet occupying a prescribed octet location of each bit-rotated version of the synchronization sequence;

detecting a first match between an octet of the incoming facsimile information and one of the compared synchronization sequence octets and designating the version of the synchronization sequence associated with the matching octet as the selected version of the synchronization sequence;

comparing the remaining octets of the selected version of the synchronization sequence to correspondingly located octets of the incoming facsimile information;

designating an eight-octet portion of the incoming facsimile information as the first-discovered synchronization sequence whenever all eight octets of the selected version of the synchronization sequence match the correspondingly located octets of the incoming facsimile data.

4. The method of claim 3, wherein the prescribed octet location corresponds to octet location 0 and the remaining octets of the selected version of the synchronization sequence are compared to the correspondingly located octets in the incoming facsimile information in sequence beginning with octet location 1 and ending with octet location 7.

5. The method of claim 1, wherein the determining the degree of bit-rotation of the SYNCH further comprises storing in a memory an indicator of the determined degree of bit-rotation.

6. The method of claim 1, wherein the predetermined number of bits is eight bits.

7. A communications device comprising:
a receiver for receiving incoming facsimile information;
a processor communicatively coupled to the receiver, the processor for:
frame-synchronizing the incoming facsimile information to delineate logical facsimile adaptation frames ("LFAFs"), the frame-synchronization including locating a synchronization ("SYNCH") frame containing a bit-rotated version of a unique synchronization sequence, the bit-rotated version comprising the unique synchronization sequence bit-rotated by a degree between zero bits and a predetermined number of bits;
determining a degree of bit-rotation of the SYNCH frame by observing the degree of bit-rotation of the bit-rotated version of the unique synchronization sequence in the SYNCH frame compared to the unique synchronization sequence with zero bit-rotation;
identifying a ("STATUS") frame;
inferring that the STATUS frame is bit-rotated to the same degree as the SYNCH frame; and
compensating for the inferred degree of bit-rotation of the STATUS frame using the observed degree of bit-rotation.

8. The communications device of claim 7, wherein each LFAF comprises eight octets in octet locations labeled 0 to 7.

9. The communications device of claim 8, wherein locating the SYNCH frame comprises:
comparing each octet of the incoming facsimile information to an octet occupying a prescribed octet location of each bit-rotated version of the synchronization sequence;
detecting a first match between an octet of the incoming facsimile information and one of the compared synchronization sequence octets and designating the version of the synchronization sequence associated with the matching octet as the selected version of the synchronization sequence;
comparing the remaining octets of the selected version of the synchronization sequence to correspondingly located octets of the incoming facsimile information;
designating an eight-octet portion of the incoming facsimile information as the first-discovered synchronization sequence whenever all eight octets of the selected version of the synchronization sequence match the correspondingly located octets of the incoming facsimile data.

10. The communications device of claim 9, wherein the prescribed octet location corresponds to octet location 0 and the remaining octets of the selected version of the synchronization sequence are compared to the correspondingly located octets in the incoming facsimile information in sequence beginning with octet location 1 and ending with octet location 7.

11. The communications device of claim 7, wherein the determining the degree of bit-rotation of the SYNCH further comprises storing in a memory an indicator of the determined degree of bit-rotation.

12. The communications device of claim 7, wherein the predetermined number of bits is eight bits.

13. A machine-readable medium having stored thereon data representing instructions that, when executed by a processor, cause the processor to perform operations comprising:
frame-synchronizing incoming facsimile information to delineate logical facsimile adaptation frames ("LFAFs"), the frame-synchronization including locating a synchronization ("SYNCH") frame containing a bit-rotated version of a unique synchronization sequence, the bit-rotated version comprising the unique synchronization sequence bit-rotated by a degree between zero bits and a predetermined number of bits;
determining a degree of bit-rotation of the SYNCH frame by observing the degree of bit-rotation of the bit-rotated version of the unique synchronization sequence in the SYNCH frame compared to the unique synchronization sequence with zero bit-rotation;
identifying a status ("STATUS") frame;
inferring that the STATUS frame is bit-rotated to the same degree as the SYNCH frame; and
compensating for the inferred degree of bit-rotation of the STATUS frame using the observed degree of bit-rotation.

14. The machine-readable medium of claim 13, wherein each LFAF comprises eight octets in octet locations labeled 0 to 7.

15. The machine-readable medium of claim 14, wherein locating the SYNCH frame comprises:
comparing each octet of the incoming facsimile information to an octet occupying a prescribed octet location of each bit-rotated version of the synchronization sequence;
detecting a first match between an octet of the incoming facsimile information and one of the compared synchronization sequence octets and designating the version of the synchronization sequence associated with the matching octet as the selected version of the synchronization sequence;
comparing the remaining octets of the selected version of the synchronization sequence to correspondingly located octets of the incoming facsimile information;
designating an eight-octet portion of the incoming facsimile information as the first-discovered synchronization sequence whenever all eight octets of the selected version of the synchronization sequence match the correspondingly located octets of the incoming facsimile data.

16. The machine-readable medium of claim 15, wherein the prescribed octet location corresponds to octet location 0 and the remaining octets of the selected version of the synchronization sequence are compared to the correspondingly located octets in the incoming facsimile information in sequence beginning with octet location 1 and ending with octet location 7.

17. The machine-readable medium of claim 13, wherein the determining the degree of bit-rotation of the SYNCH further comprises storing in a memory an indicator of the determined degree of bit-rotation.

18. The machine-readable medium of claim 13, wherein the predetermined number of bits is eight bits.

* * * * *